United States Patent [19]

Seymour et al.

[11] Patent Number: 5,776,768
[45] Date of Patent: Jul. 7, 1998

[54] COLD WEATHER COMPOSTING APPARATUS

[75] Inventors: Shaun A. Seymour, New Holland, Pa.; Mark E. Singley, Belle Meade, N.J.

[73] Assignee: New Holland North America, Inc., New Holland, Pa.

[21] Appl. No.: 761,417

[22] Filed: Dec. 6, 1996

[51] Int. Cl.$^6$ .................................................... C05F 9/02
[52] U.S. Cl. .................... 435/290.3; 435/290.4; 435/286.6
[58] Field of Search ............... 435/290.3, 290.4, 435/286.6; 422/220; 71/9

[56] References Cited

U.S. PATENT DOCUMENTS

| | | | |
|---|---|---|---|
| 2,954,285 | 9/1960 | Carlsson et al. | 71/9 |
| 3,054,663 | 9/1962 | Kromline | 23/259.1 |
| 3,055,744 | 9/1962 | Petersen | 71/9 |
| 3,178,267 | 4/1965 | Larson | 23/259.1 |
| 3,676,074 | 7/1972 | Shibayama et al. | 23/259.1 |
| 4,255,389 | 3/1981 | Jung et al. | 435/290.3 |
| 5,047,349 | 9/1991 | Eweson | 435/312 |
| 5,169,782 | 12/1992 | Murphy et al. | 435/290.3 |
| 5,300,438 | 4/1994 | Augspurger et al. | 435/312 |
| 5,407,809 | 4/1995 | Finn | 435/41 |
| 5,534,437 | 7/1996 | Arrau | 435/290.3 |

FOREIGN PATENT DOCUMENTS 53-134667  11/1978  Japan ............................................ 71/9

*Primary Examiner*—William H. Beisner
*Attorney, Agent, or Firm*—Frank A. Seemar; Larry W. Miller; J. William Stader

[57] ABSTRACT

A rotary composter having a rotatably mounted cylindrical vessel divided by baffles into a plurality of compartments, including a first infeed compartment, a last discharge compartment, and a plurality of intermediate digesting compartments. The baffles between the infeed and discharge compartments and the adjacent digesting compartments are configured to retain a supply of microbial inoculant material. A drive mechanism is operable to rotate the vessel at variable speeds to permit the mixing process of material in the vessel to be selectively varied. Air, forced through the vessel from the discharge end to the infeed end, may be preheated prior to introduction into the vessel to assure proper composting during cold weather.

9 Claims, 4 Drawing Sheets

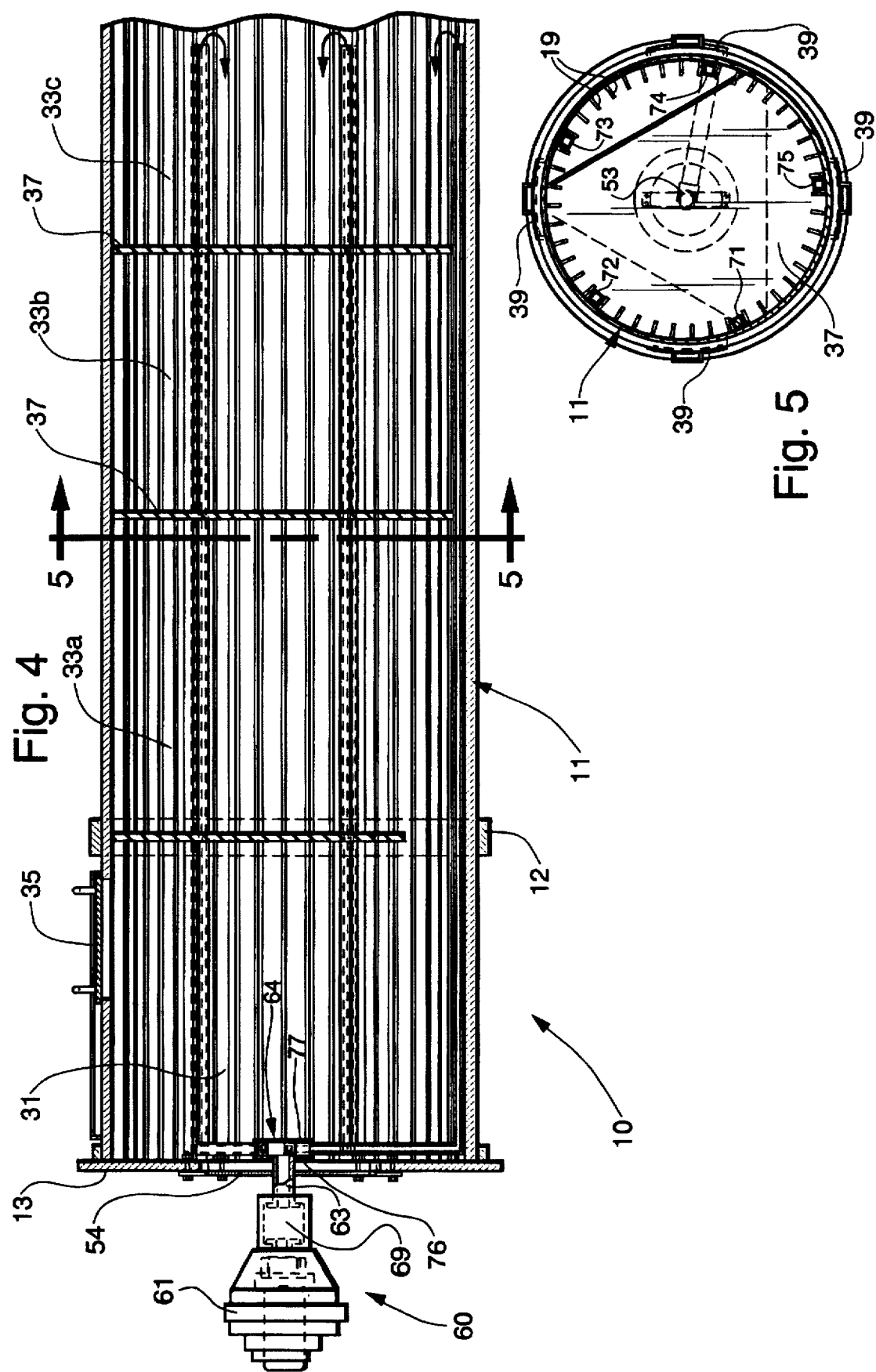

COLD WEATHER COMPOSTING APPARATUS

FIELD OF THE INVENTION

This invention relates generally to a machine for creating compost from waste material, such as manure and biodegradable garbage, and more particularly, to apparatus for the biological degradation of organic waste materials during cold weather conditions.

BACKGROUND OF THE INVENTION

Present day manure handling techniques typically provide for a collection of raw manure until weather and ground conditions are acceptable to permit such raw manure to be spread over the fields. Since the nitrogen within raw manure is not fixed in this type of operation, any runoff, such as that which would occur following a storm, could have the potential for polluting sources of water supply, such as streams. Furthermore, free nitrogen in the form of nitrates can leach into the ground, resulting in the pollution of sub-surface water sources as well. Accordingly, non-point sources of pollution, such as those originating from the apparatus and methods used in various manure handling systems in industrial and farming operations, are coming under closer scrutiny by legislative bodies and regulating agencies to avoid serious environmental problems cased by what are considered unsound practices.

Rotary composters are being proffered as a viable solution to the above mentioned environmental problems. Exemplary of prior art composters is the apparatus disclosed in U.S. Pat. No. 5,407,809, issued to Larry J. Finn on Apr. 18, 1995. The process in this unit achieves an accelerated biological degradation of waste material to create compost. While any biodegradable material can be digested within rotary composters, farm wastes, such as animal manure, are of particular interest because of the desire to fix the nitrogen within the material to prevent stream pollution when composted waste is spread onto the ground.

A problem with known rotary composting systems of the type disclosed in U.S. Pat. No. 5,407,809, mentioned above, is the capability of providing apparatus that yields consistently effective results, regardless of the waste materials being composted, and notwithstanding drastic variations in ambient temperature. In U.S. application Ser. No. 08/660,136, entitled ROTARY COMPOSTER, filed Jun. 7, 1996 in the name of Shaun A. Seymour and assigned to a common assignee, a rotary composter is disclosed that provides a system with features that furnish a unique solution to the problem of consistently effective operation. In this unit the composting vessel is designed to process waste material within approximately three days. While the loading of waste material into the infeed end of the apparatus may be substantially continuous, actually on a periodic basis during the day, compost could be discharged in the same continuous manner. Accordingly, the system, which is designed to retard material flow through the composting vessel so that it is retained for a predetermined period, i.e., at least three days, provides for continuous uninterrupted operation. During the digesting process, an adequate air supply is provided to produce a counterflow of air through the vessel.

Because the biological degradation process is aerobic in nature, and the vessel is designed to maintain a temperature of approximately 120 to 160 degrees fahrenheit, the target range of 130 to 150 degrees is reached without difficulty during normal ambient conditions. It has been determined by experimentation that if the microbial action produces heat during the composting process and such heat is maintained in the range of 130–150 degrees fahrenheit, harmful bacteria in the form of pathogens will be killed. This range is easily attainable unless ambient temperature is unsuitably low whereupon the range is not maintained, pathogens will not be killed, resulting in a significant pollution problem when the material carrying such pathogens is discharged. Thus, maintaining this temperature range is critical to proper and effective operation, regardless of low ambient temperature during cold weather use.

It is therefore desirable to provide an improved rotary composter, and more particularly provide improvements to the type of rotary composter disclosed in U.S. application No. 08/660,136, which improvements will enable efficient operation to be carried out under a variety of operating conditions, especially during cold weather.

SUMMARY OF THE INVENTION

An important object of this invention is to provide a rotary composter having an improved design that enhances the effectiveness of operation by maintaining the operating temperature in the critical range in a simple and effective manner.

In pursuance of this and other important objects the present invention provides for an improved rotary composter comprising a frame, a hollow vessel rotatably supported on the frame for rotation about a longitudinal axis, the vessel being defined by a generally cylindrical outer wall and having an infeed end oriented above a remote lower discharge end. The vessel is divided into a plurality of compartments, including an infeed compartment at the infeed end wherein an access opening is provided for loading material into the infeed compartment. A discharge compartment is provided at the discharge end with one or more discharge openings for removing material from the discharge compartment. The vessel also includes two or more successive digesting compartments positioned between the infeed compartment and the discharge compartment with a baffle separating adjacent compartments within the vessel, each of which baffles have a passageway to permit the passage of material to the lower adjacent compartment. The vessel is rotated at a rate of rotation that results in controlled flow of material from the infeed compartment to the discharge compartment. Air infeed means introduce into the vessel a flow of air that passes through the vessel in a direction opposite to the direction of material flow. More particularly, the invention contemplates unique means for heating the air prior to introduction into the vessel to enhance operation during cold weather.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE DRAWINGS

FIG. 4 is a view taken in the direction of arrows 4—4 in FIG. 3.

FIG. 5 is a view taken in the direction of arrows 5—5 in FIG. 4.

DESCRIPTION OF THE PREFERRED EMBODIMENT

Figure 1:
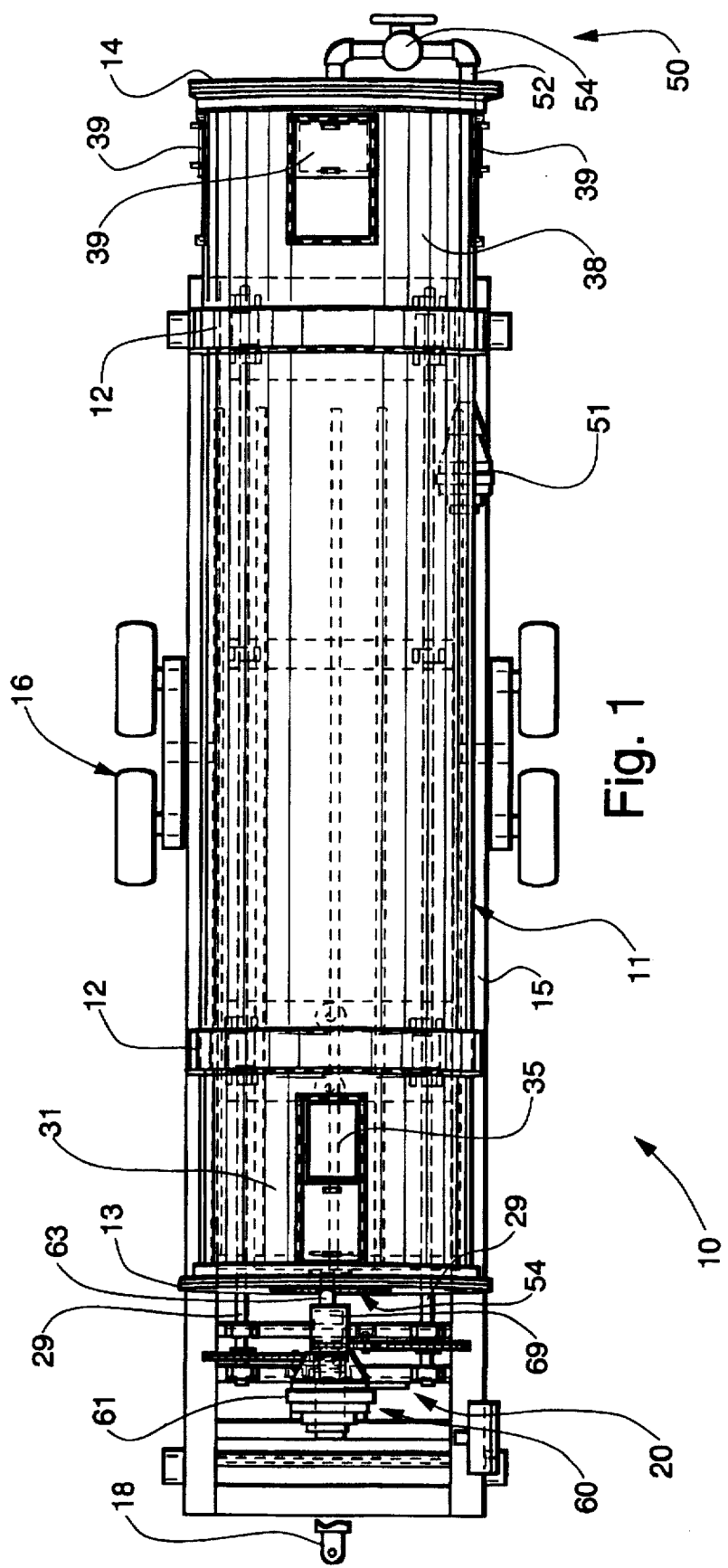
FIG. 1 is a top plan view of a rotary composter incorporating principles of the present invention.
Figure 2:
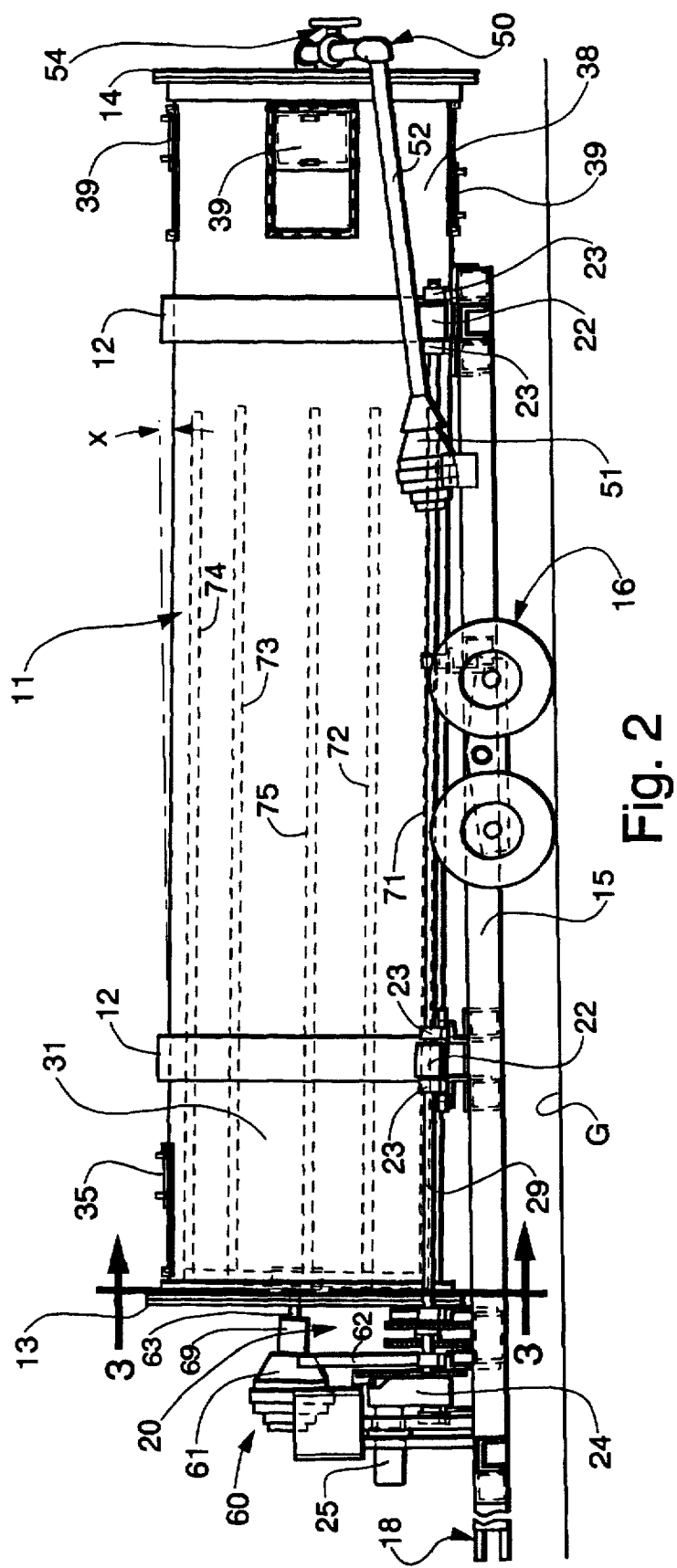
FIG. 2 is a side elevational view of the rotary composter shown in FIG. 1.

Referring now to the drawings and, more particularly, to FIGS. 1 and 2, a rotary composter, generally designated by reference numeral 10, is shown, similar to the composter depicted in the above mentioned patent application Ser. No. 08/660,137, now abandoned the description of which application is hereby incorporated by reference.

Rotary composter 10 is constructed as a generally cylindrical drum-like vessel 11 rotatably supported on a wheeled trailer frame 15 having a set of wheels 16 to permit movement of composter 10 over the ground G. A hitch member 18 is provided to connect trailer frame 15 to a prime mover. One skilled in the art will readily realize that the mobility of wheeled trailer frame 15 is not a critical factor of the instant invention, as wheels 16 need to be removed from frame 15 when composter 10 is set up for operation to provide proper leveling and more stability.

Frame 15 provides support for the rotation of drum 11, as will be described in greater detail below, and further supports drive mechanism 20. Vessel 11 is inclined downwardly on frame 15 from the inlet or infeed end 13 toward discharge end 14, preferably at an angle "x" of approximately one and a half degrees from horizontal, as illustrated in FIG. 2. Preferably, the exterior circumference of vessel 11, except for a pair of longitudinally spaced traction bands 12, is covered with a layer of polyurethane foam (not shown) to insulate vessel 11 and retain heat generated by the composting process.

Insofar as drive mechanism 20 is concerned, attention is directed to traction bands 12 extending around the outer circumference of vessel 11. Frame 15 supports a pair of transversely spaced drive rollers 22, best seen in FIG. 2, engaged with each of the traction bands 12 to effect rotation of vessel 11. Drive mechanism 20 further includes a motor 25, preferably electrical, although other primary drive members, such as a hydraulic motor, could be used. The output shaft from motor 25 is operably coupled to a reduction gear box and a pair of chain drives that effect rotation of a corresponding pair of drive shafts 29 connected to drive rollers 22 to effect the final rotation of vessel 11, which is at approximately one half of a revolution per minute or less.

Preferably, motor 25 is variable in speed so that the speed of rotation of vessel 11 can be varied within the range of two and a half minutes per revolution to approximately thirteen minutes per revolution. Since the vessel is inclined relative to horizontal so that rotation thereof will move material within the vessel toward discharge end 14, each traction band 12 is captured by a thrust bearing 23, as best seen in FIG. 2, supported by frame 15 to prevent longitudinal displacement of vessel 11 relative to frame 15. This arrangement is shown and described in detail in the aforementioned patent application, Ser. No. 08/660,137, now abandoned previously incorporated by reference.

Figure 3:
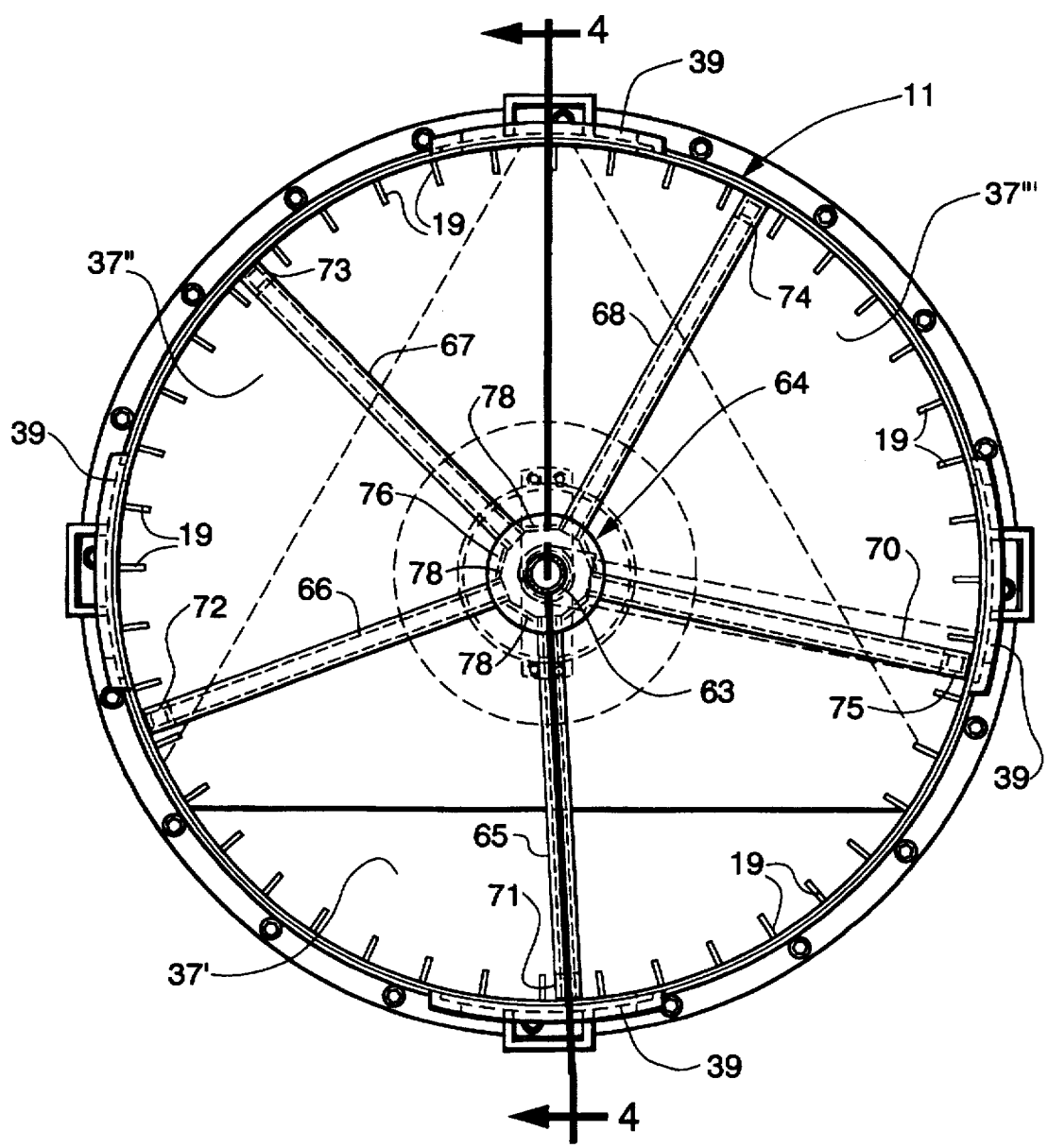
FIG. 3 is a view taken in the direction of arrows 3—3 in FIG. 2.

Referring now to FIGS. 3–5, it can be seen that vessel 11 is divided into a series of discrete compartments. Beginning at infeed end 13, the first vessel compartment 31 is defined as the space between the end wall of vessel 11 and the first baffle 36 and is adapted for receiving material to be composted. The first or infeed compartment 31 is provided with an access door 35 formed within the exterior circumference of vessel 11 to permit the introduction of material to infeed compartment 31. Access door 35 is preferably slidable between an opened position and a closed position to prevent the spilling of material from infeed compartment 31 as vessel 11 rotates.

The last compartment at discharge end 14 of vessel 11 is defined as the space between the discharge end wall and a last baffle, not shown. The last or discharge compartment 38 is provided with four discharge doors 39 equally spaced around the circumference of vessel 11. Discharge doors 39 are preferably slidable and can be moved between opened and closed positions to control the discharge of compost therefrom. The opening of discharge doors 39 will allow compost within the discharge compartment 38 to spill therefrom as vessel 11 is rotated. Between infeed compartment 31 and discharge compartment 38, vessel 11 is divided into a plurality, preferably four, of digesting compartments 33 separated by an interior baffle 37, the details of which are shown and described in detail in the aforementioned patent application.

Referring now to FIGS. 1 and 3–5, it can be seen that interior baffles 37 are constructed as a truncated disc that covers approximately 85 percent of the cross-sectional area of vessel 11 (see FIG. 5). The passageway formed by the missing segment of the circular disc-like baffles 37 is oriented 120 degrees out of phase with the immediately succeeding or preceding baffle 37. Looking first at FIG. 3, it can be seen that the passageway comprises an uninterrupted serpentine path, defined by missing segments 37', 37", 37"', through the digesting compartments.

For the purposes of this invention it is only necessary that vessel 11 comprise an infeed compartment 38, or first vessel compartment 31, a discharge compartment at discharge end 14, and a plurality of successive digesting compartments, e.g., compartments 33a, 33b, 33c, shown in FIG. 4. For a detailed description of a vessel of this type, reference is again made to U.S. Pat. application Ser. No. 08/660,137, now abandoned wherein a unit is disclosed in which four digesting compartments are utilized.

Turning briefly to the operation, one skilled in the art will recognize that only small amounts of material in one digesting compartment pass into the succeeding digesting compartment on each revolution of vessel 11. Further, since the speed of rotation of vessel 11 is in the order of a half of a revolution or less per minute, one skilled in the are will also recognize that vessel 11 can retain material for three or more days from the time it is fed into the infeed compartment 31 and is discharged from the discharge compartment 38. During this time period, counterflowing air is introduced.

Referring now to FIGS. 1 and 2, a primary air infeed mechanism 50 can best be seen. A supply of ambient air is fed into discharge compartment 38 to be pushed through vessel 11 to exit at the screened opening 54 in infeed compartment 31. The staggered arrangement of interior baffles 37, as described above, requires that the air fed into discharge compartment 38 will necessarily follow a serpentine path to reach infeed compartment 31. The spiraled movement of air through vessel 11 facilitates interaction of the air through the material within digesting compartments 33. The direction of the flow of air through vessel 11 is opposite to the direction of material flow through vessel 11 in order to reduce the temperature of the material within discharge compartment 38 and to transfer heat into the digesting compartments 33 from the discharge compartment.

A blower 51 supported on trailer frame 15 forces air through a pipe 52 that extends around the exterior of vessel 11 to the center of discharge end 14 via a valve 54 to inject air into discharge compartment 38, under conditions where valve 54 is open. The pipe 52 passes through and is sealed against the discharge end wall to terminate a short distance from the discharge end wall within compartment 38 to define an air infeed port 53. Pipe 52 is fixed relative to frame 15 and vessel 11 rotates relative to pipe 52.

Preferably, vessel 11 is approximately seven feet in diameter and approximately thirty-four feet in length. Vessel 11 is divided into a plurality of compartments, including infeed compartment 31, discharge compartment 38 and interior digesting compartments. Preferably, infeed compartment 31 will be the largest of the compartments and each subsequent compartment will be smaller in size such that discharge compartment 38 is approximately half the size of infeed compartment 31. Each interior baffle 37 is provided with a passageway formed by a missing segment that measures approximately one and a half feet along the radius of vessel 11.

The interior surface of vessel 11 is provided with a plurality of circumferentially spaced lifter ribs 19 that extend radially into the interior of vessel 11 about one and one half inches and are spaced apart about six inches around the circumference. When vessel 11 is rotating, the segmented openings in the baffles, offset around the circumference of vessel 11, act like a large screw. Lifter ribs 19 elevate the material in small increments through the passageways into the subsequent compartment on each rotation of vessel 11. The opening in the last baffle maintains a level of material within vessel 11 to ensure that none of the interior compartments can be completely emptied so that an inoculum is retained in each compartment to provide a staged microbiological culture for each of the digesting compartments.

Under normal ambient air conditions, air is supplied by blower 51. When discharge doors 39 are closed, vessel 11 is substantially sealed so that air is forced through the composting materials in the successive compartments to be discharged through screened opening 54. The direction of the flow of air is counter to the direction of the flow of the composting material through vessel 11. Since the successive passageways are circumferentially offset, the air must move down through one passageway and then around to the next passageway and so on until passing through all digesting compartments.

The time of passage of material through vessel 11 is of critical importance. The material within the digesting compartments must achieve thermophylic temperatures, i.e. approximately 150 degrees F., although the material discharged from the discharge compartment may have temperatures reduced to the mesophilic range, i.e. less than 100 degrees F. Start-up procedures commonly include the passage of the initially introduced materials back into the infeed compartment for reprocessing until the materials have reached the thermophylic temperatures and the composting of the materials has been completed. Once the start-up procedure has been completed, material need only pass through vessel 11 one time, provided that thermophylic temperatures have been achieved. During cold weather the thermophylic temperature may be difficult to attain when using the primary air supply system, due to low ambient temperature. Under circumstances of this nature, the present invention provides a secondary air supply, generally designated by reference numeral 60, by which preheated air is discharged into the vessel.

Referring now to FIGS. 1–5, secondary air supply system 60 includes a blower 61 mounted stationarily on frame 15 via a mounting bracket 62. Blower 61 forces ambient air through a pipe 63 to an air distribution assembly most of which is mounted within vessel 11 for rotation therewith. Pipe 63 rotates relative to a fixed transition assembly 69 attached to blower 61. The distribution assembly comprises a manifold 64, five radially extending tubular air conduits 65, 66, 67, 68, 70, each of which communicates with a lateral air conduit 71, 72, 73, 74, 75, respectively, secured to the interior surface of vessel 11. The lateral conduits each have a discharge end terminating in digesting compartment 33c.

Manifold 64 includes an air receiving section defined by an air inlet wall 76 through which pipe 63 supplies air, a solid opposing wall 77, and a series of sidewall segments 78 which provide integrity for the air as it is received and distributed via the radial conduits to the lateral conduits. The tubular air conduits are generally square in cross section and provide added rigidity to vessel 11. Further, the lateral conduits by virtue of their radially extending surfaces assist with the function of the digester ribs during processing.

Turning now to the general process, for rapid composting, three factors must customarily be considered. Firstly, the carbon nitrogen ratio, secondly, the moisture content, and lastly the void space within the material must be given due regard. With respect to the third factor, since composter 10 is designed to create a robust tumbling action, a void space is created during the operational process that must be properly controlled to avoid deleterious affects. This has been embraced by the structure of the vessel, which is covered by the abovementioned earlier filed application. The other two factor are equally as important. Looking at the first factor, it is well known that for the composting process to be optimized, the carbon nitrogen ratio should be in the range of 30 to 1. Each possible input material has a different carbon to nitrogen ratio and the ratio varies widely between materials, requiring close attention to the recipe. By way of example, the carbon to nitrogen ratio of paper is in the range of 127 to 178, and wood chips is within the wide range of 212 to 1,313, while at the low end cattle manure is about 19, activated sewage sludge is 6, and hay 15 to 32.

With respect to moisture content, nearly all materials used in composter 10 will have a high moisture content. The goal for optimum composting is to have the moisture content at 60* or less in the first two digesting compartments. Preferably, the material fed into infeed compartment 31 should have a moisture content of less than 50% because the flow of air through the digesting compartments will carry increasing levels of moisture as the air temperature rises as it passes through the digesting compartments where the material is at a thermophylic range, but moisture condenses out of the air as it cools upon entry into the infeed compartment. Thus, if the material to be composted is high in moisture, such as cattle manure, it is preferable to have a sufficient supply of dry bulking materials, such as wood chips or paper to reduce the moisture to the desired target range.

Typically, composter 10 would utilize several materials in a recipe to provide the most efficient composting operation. For example, digested sewage sludge is low in volatile solids and energy so that it is unable to generate as robust a composting process as cattle manure. Therefore, a material with a high, readily available energy is needed to mix with the sewage sludge if it is the principal material to be composted, while bearing in mind the desired carbon nitrogen ratio and preferred moisture range.

In operation, the materials to be composted are deposited in infeed compartment 31 through infeed door 35 of vessel 11. Rotation of vessel 11 is stopped with infeed door 35 positioned at the top of vessel 11. Preferably, the different materials, based on a predetermined recipe, as discussed above, are placed into the vessel in alternating fashion to enhance mixing of the materials.

After infeed compartment 31 is substantially filled, drive mechanism 20 is re-started to rotate vessel 11 on drive rollers 22. As described above, material within infeed compartment 31 will pass into the first digesting compartment. Passage from the first digesting compartment to the subsequent digesting compartments occurs in a relatively slow fashion as only small amounts of material can pass through the passageways formed in the interior baffles 37 on each revolution of vessel 11. Under normal ambient temperatures, air infeed mechanism 50 is operated to blow air into the vessel 11, and secondary air infeed system 60 is off.

While the material is within vessel 11 and working its way through digesting compartments 33 toward discharge compartment 34, microbes are digesting the material in a known manner to reduce the material into compost. This conversion of material into compost also involves a substantial reduction in the volume of the material such that there is possibly 50% less material by volume discharged from vessel 11 than is fed into infeed compartment 31. The composting process generates substantial heat, preferably thermophylic temperatures near 150 degrees F., but at least in the range of 130 150 degrees F. To retain the heat within vessel 11, the entire circumference of the vessel (except for traction bands 12) is coated with a layer of insulation, preferably a four inch layer of urethane foam.

When a composting operation is initiated, the first materials fed through vessel 11 will not likely reach the thermophylic stage and will require re-introduction into infeed compartment 31, preferably mixed with fresh material to be composted. Once composter 10 is running continuously and thermophylic temperatures are maintained, the raw material fed into infeed compartment 31 will be completely converted into compost by the time the material reaches discharge compartment 34, approximately three days later.

In the event thermophylic temperatures cannot be maintained due to low ambient temperature, valve 54 is closed and secondary air infeed system 60 is employed. Blower 61 is energized forcing air through inlet pipe 63 to manifold 64, which in turn distributes air evenly to the five air conduits which discharge the air into digesting compartment 33c whereupon it initiates the conterflowing air stream that travels toward outlet screen 54 in the same general manner as the counterflow of air provided by primary air infeed system 50. The significant difference being that the air discharged into the digesting compartment 33c by the secondary air infeed system has been preheated due to the heat exchange process that takes place as the heat travels through the digesting compartments via lateral air conduits 71, 72, 73, 74, 75, that are in direct contact with material that is generating heat during the composting process. This unique arrangement preheats the air discharged into vessel 11 to a level that permits thermophylic temperature to be maintained at the level necessary to effectively produce properly prepared compost, i.e., the composting process operates in the range necessary to kill pathogens.

Finally, material is discharged from discharge compartment 34 during rotation of vessel 11 simply by opening discharge doors 39 and collecting the material discharged therefrom. Preferably, a conveyor (not shown) will be positioned to collect the discharged compost and convey it to a preselected location for cool down and subsequent disposition. For compost formed from animal wastes, the nitrogen in the compost is fixed, pathogens have been killed, and the compost can be spread directly onto the ground without fear of contamination of the water supply from runoff or leaching into the ground water.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In a rotary composter having
   a vessel rotatably supported for rotation about a longitudinal axis, said vessel comprising an infeed end, a discharge end below said infeed end and an outer wall,
   said vessel further comprising longitudinally spaced baffles for dividing said vessel into an infeed compartment, a remote discharge compartment and a plurality of intermediate digesting compartments,
   drive means for rotating said vessel about said longitudinal axis to move material from said infeed compartment through said digesting compartments to said discharge compartment, and
   an air infeed means in the vicinity of said discharge end for forcing a flow of air from a first source of air through said vessel toward air exit means in said infeed end under conditions where said material is being moved through said vessel, the improvement comprising
   secondary air infeed means comprising an air distribution assembly disposed in said vessel, and a blower for introducing a secondary supply of air into said distribution assembly,
   said air distribution assembly including means for discharging said secondary supply of air into said vessel for flow toward said air exit means, and
   means for preheating said secondary supply of air in said air distribution assembly prior to discharge thereof into said vessel.

2. In a rotary composter as set forth in claim 1 wherein said improvement further comprises
   means for interrupting said first source of air.

3. The rotary composter of claim 2 wherein
   said means for preheating said air comprises a plurality of conduits mounted in one or more of said plurality of digesting compartments.

4. The rotary composter of claim 3 wherein
   said plurality of conduits are longitudinally disposed and affixed to the inner surface of said hollow vessel.

5. The rotary composter of claim 3 wherein
   said plurality of conduits are generally rectangular in cross section and are adapted to aggressively engage said material during rotation of said vessel to assist in urging material from said infeed end to said discharge end.

6. The rotary composter of claim 3 wherein
   said means for discharging comprises said plurality of conduits each having a discharge end in the final digesting compartment.

7. The rotary composter of claim 6 wherein
   said plurality of conduits are longitudinally disposed and affixed to the inner surface of said hollow vessel.

8. The rotary composter of claim 7 wherein
   said plurality of conduits are generally rectangular in cross section and are adapted to aggressively engage said material during rotation of said vessel to assist in urging material from said infeed end to said discharge end.

9. The rotary composter of claim 3 wherein said air distribution assembly further comprises a manifold affixed within said infeed compartment for rotation with said vessel, pipe means through which said secondary supply of air flows between said blower and said manifold, and a plurality of generally radial conduits extending between said manifold and said plurality of conduits mounted in said one or more digesting compartments.

\* \* \* \* \*